United States Patent
Sikora

(10) Patent No.: US 12,515,391 B2
(45) Date of Patent: Jan. 6, 2026

(54) METHOD FOR DETERMINING SAGGING OF MELT OF A TUBE EXTRUDED IN AN EXTRUSION DEVICE

(71) Applicant: Sikora AG, Bremen (DE)

(72) Inventor: Harald Sikora, Bremen (DE)

(73) Assignee: Sikora AG, Bremen (DE)

( * ) Notice: Subject to any disclaimer, the term of this patent is extended or adjusted under 35 U.S.C. 154(b) by 287 days.

(21) Appl. No.: 18/036,480

(22) PCT Filed: Oct. 29, 2021

(86) PCT No.: PCT/EP2021/080214
§ 371 (c)(1),
(2) Date: May 11, 2023

(87) PCT Pub. No.: WO2022/106180
PCT Pub. Date: May 27, 2022

(65) Prior Publication Data
US 2023/0415400 A1  Dec. 28, 2023

(30) Foreign Application Priority Data

Nov. 17, 2020 (DE) .......... 10 2020 130 298
Nov. 23, 2020 (DE) .......... 10 2020 130 903

(51) Int. Cl.
*B29C 48/92* (2019.01)
*B29C 48/09* (2019.01)
(Continued)

(52) U.S. Cl.
CPC .............. *B29C 48/92* (2019.02); *B29C 48/09* (2019.02); *B29C 48/9115* (2019.02);
(Continued)

(58) Field of Classification Search
CPC ..... B29C 48/92; B29C 48/09; B29C 48/9115; B29C 2948/92152; B29C 2948/92171;
(Continued)

(56) References Cited

U.S. PATENT DOCUMENTS 4,882,104 A * 11/1989 Dobrowsky .......... B29C 48/865
702/170
2018/0112973 A1* 4/2018 Sikora ....................... G01J 5/10

FOREIGN PATENT DOCUMENTS

CN        208317042 U   *  1/2019
DE   202007014876 U1      1/2008
(Continued)

OTHER PUBLICATIONS

English translation of EP-3480553-A1 by EPO. (Year: 2019).*
(Continued)

*Primary Examiner* — Xiao S Zhao
*Assistant Examiner* — Inja Song
(74) *Attorney, Agent, or Firm* — Barclay Damon LLP

(57) ABSTRACT

A method for determining sagging of melt of a tube extruded in an extrusion device includes structuring a measuring device to rotate about the tube. The measuring device is configured to measure a wall thickness of the tube over a circumference of the tube and determine a wall-thickness profile over the circumference of the tube from the measured wall thicknesses. The wall-thickness profile includes a frequency and an amplitude. The method further includes determining a sagging of the melt from at least one of (i) the frequency and (ii) the amplitude of the wall-thickness profile.

13 Claims, 2 Drawing Sheets

(51) Int. Cl.
  *B29C 48/88* (2019.01)
  *B29L 23/00* (2006.01)
(52) U.S. Cl.
  CPC ........... *B29C 2948/92152* (2019.02); *B29C 2948/92171* (2019.02); *B29C 2948/92447* (2019.02); *B29C 2948/92666* (2019.02); *B29C 2948/92704* (2019.02); *B29L 2023/22* (2013.01)
(58) Field of Classification Search
  CPC ........... B29C 2948/92447; B29C 2948/92666; B29C 2948/92704; B29C 2948/92647; B29C 2948/92123; B29L 2023/22; G01B 11/24; G01N 21/3581; B29K 2021/006; B29K 2105/26
  See application file for complete search history.

(56) References Cited

FOREIGN PATENT DOCUMENTS

| | | | |
|---|---|---|---|
| DE | 102010029757 A1 | 12/2011 | |
| DE | 102015122205 A1 | 6/2017 | |
| DE | 102016109087 A1 | 11/2017 | |
| DE | 202018006144 U * | 4/2019 | |
| DE | 202018006144 U1 | 6/2019 | |
| DE | 102018124175 A1 | 4/2020 | |
| EP | 1554105 B1 | 1/2012 | |
| EP | 2752287 A1 | 7/2014 | |
| EP | 3480553 A1 * | 5/2019 | ........... G01B 11/028 |
| JP | H05116201 A * | 5/1993 | ........ B29C 47/0023 |
| JP | H06320605 A * | 11/1994 | ............ B29C 48/92 |
| WO | 2016139155 A1 | 9/2016 | |
| WO | 2017101906 A1 | 6/2017 | |
| WO | 2019086081 A1 | 3/2019 | |
| WO | 2020070047 A1 | 4/2020 | |
| WO | WO-2020200360 A1 * | 10/2020 | ........... G01B 11/026 |
| WO | WO-2020207540 A1 * | 10/2020 | ........... G01B 11/026 |

OTHER PUBLICATIONS

English translation of DE-202018006144-U by EPO. (Year: 2019).*
English translation of JP-H05116201-A by EPO. (Year: 1993).*
English translation of CN-208317042-U by EPO. (Year: 2019).*
English translation of WO-2020200360-A1 by EPO. (Year: 2020).*
English translation of WO-2020207540-A1 by EPO. (Year: 2020).*
English translation of JP-H06320605-A by EPO. (Year: 2014).*
Hauck et al., Terahertz inline wall thickness monitoring system for plastic pipe extrusion, AIP Conference Proceedings 1593, 86 (2014), Feb. 17, 2015 (5 pages).
PCT/EP2021/080214, International Search Report and Written Opinion, Date of Mailing Feb. 14, 2022 (10 pages).
PCT/EP2021/080214, English translation of International Search Report, Date of Mailing Feb. 14, 2022 (3 pages).
WIPO as ISA/WO, Notice of Transmittal of English Translation of the International Preliminary Report on Patentability (IPRP) with English language IPRP for International Application No. PCT/EP2021/080214, mailed Jun. 1, 2023 and as published in German (total16 pgs.).
Japanese Patent Office; Japanese Office Action; Application No. 2023-526302 Drafted Date: Sep. 24, 2024; (8 pages).
Japanese Patent Office; Japanese Office Action; Application No. 2023-526302 Drafted Date: Sep. 24, 2024; English Translation, (8 pages).
DE 102020130903.1, filed Nov. 23, 2020, German Office Action, Dated Mar. 27, 2024 (6 pages).

* cited by examiner

METHOD FOR DETERMINING SAGGING OF MELT OF A TUBE EXTRUDED IN AN EXTRUSION DEVICE

CROSS REFERENCE TO RELATED INVENTION

This application is a national stage application pursuant to 35 U.S.C. § 371 of International Application No. PCT/EP2021/080214, filed on Oct. 29, 2021, which claims priority to, and benefit of, German Patent Application No. 10 2020 130 298.3, filed Nov. 17, 2020, the entire contents of which are hereby incorporated by reference.

TECHNOLOGICAL FIELD

This disclosure relates to a method for determining sagging of melt of a tube extruded in an extrusion device.

BACKGROUND

In extrusion devices, plastic tubes, for example, are extruded, wherein the tubes exiting the extrusion device are regularly conveyed along their longitudinal direction. In this process, they typically pass through multiple cooling sections, in which a cooling liquid, for example, water, is sprayed onto the outer surface of the tube to cool the tubes Immediately after exiting the extrusion device, the melt of the extruded tubes is still able to flow over wide regions, meaning it has not yet solidified. During the cooling process, intensified by the cooling sections, the tubes cool down until they completely harden or, respectively, solidify.

A method for measuring the diameter and/or the wall thickness of a tube by means of terahertz radiation is known from WO 2016/139155 A1. With this measurement method, a precise determination of geometric parameters, such as diameter or wall thickness of tubes extruded in an extrusion device, is possible. In particular, when tubes are measured shortly after exiting the extrusion device, the determined geometric parameters can deviate from the actual geometric parameters in the completely solidified state of the tube. In particular, during the solidification of extruded tubes, downward sagging of the melt as a result of gravity regularly occurs, as a result of which the wall thickness ratios between upper and lower regions of the tube change over the course of the cooling. Sagging of the melt cannot be completely prevented. It is attempted to counteract the sagging in an anticipatory manner by purposely setting a non-uniform wall thickness at the exit from the extrusion device. In doing so, the sagging needs to be precisely controlled. However, the sagging is difficult to detect by measuring.

Proceeding from the explained prior art, the object of the invention is to provide a method of the type mentioned at the outset, by means of which the sagging of the melt can be detected more simply and more precisely compared to the prior art.

BRIEF SUMMARY OF THE INVENTION

For a method of the type mentioned at the outset, the invention achieves the object in that the wall thickness of the tube is measured over the circumference of the tube and a wall-thickness profile over the circumference of the tube is produced from the measured wall thicknesses, and that sagging of the melt is determined from the frequency and/or the amplitude of the wall-thickness profile produced.

The tube measured according to the invention can be, for example, a plastic tube. It is extruded in an extrusion device. In extrusion devices, as is known, extrusion material is melted through heating and the melt is discharged through an extruder nozzle modeling the shape of the object to be extruded. For this purpose, the extruder nozzle has at least one exit opening. The extruded tube is discharged from the extrusion device in the longitudinal direction and conveyed further in the longitudinal direction. In particular, the tube is conveyed in the longitudinal direction during the measurement according to the invention. It is possible that, during the measurement according to the invention of the wall thickness, the tube is not completely solidified, meaning still has flowable components. After it exits the extrusion device, the tube can pass through one or more cooling sections. In such cooling sections, as explained, a cooling liquid, for example, such as water is sprayed onto the outer surface of the tube for cooling Immediately after exiting the extrusion device and continuing over a further region of the conveying section, the tube is not yet completely solidified and accordingly still has flowable components in the form of a melt. Passing through the cooling sections, the tube is successively solidified further until it achieves its final shape. After passing through a first cooling section, the tube is typically not yet completely solidified, meaning it still has flowable components.

As explained, during the solidification of the tube, a downward sagging of the melt occurs. As also explained, the sagging cannot be completely avoided since the melt is shaped into a tube directly in the head of the extruder nozzle. The sagging can be anticipated in that, at the exit from the extrusion device, the tube is purposely discharged with a greater wall thickness in the upper region than in the lower region. In principle, it is desired to set the temperature of the melt in the extruder as high as possible, since this is synonymous with a high output capacity and corresponding productivity of the extrusion device. On the other hand, the risk of uncontrolled sagging of the melt in the lower region of the tube and thus an impermissible deviation in shape of the completely cooled-down tube increases with the temperature.

Setting elements, for example, plate-shaped setting elements, are often provided on the head of the extruder nozzle of such extrusion devices. Such setting elements are typically arranged in the vicinity of the at least one exit opening of the extruder nozzle. With the setting elements, the wall thickness at the exit from the extruder nozzle of the extrusion device can be set at multiple points over the circumference of the tube. Common extruder nozzles have, for example, 10, 16, or 20 such setting elements, which are arranged in particular in the region of the inner tube wall. Each of these setting elements can be adjusted mechanically and/or is provided with a heater to enable a variability of the wall thickness in this region. A higher temperature of the tube leads to more pronounced flow behavior. It would also be conceivable to supply such setting elements with more or less of a lubricant to suitably set the wall thickness of the tube over the circumference of the tube.

The invention is based on the surprising realization that the aforementioned setting elements lead to a modulation of the wall thickness over the circumference of the tube, which can still be identified after the wall has cooled down, in particular in the interior of the tube, by measuring, in particular with an exact wall thickness measurement, for example, a terahertz radiation wall thickness measurement, as explained in more detail below. In particular, the wall-thickness profile has a frequency and/or amplitude modulation that can be detected by measuring. The present inventors assume that this modulation is caused by the setting elements. The wall-thickness profile can be modulated, in particular, according to a periodic function, such as a cosine or sine function. The amplitude of the modulation of the wall thickness is very small. For example, at an average wall thickness of approximately 10 mm, the amplitude of the modulation of the wall thickness is approximately 10 μm, accordingly approximately 0.1%. With correspondingly precise wall thickness measurement methods, the modulation can, however, be reliably detected.

The invention is also based on the realization that the frequency and/or amplitude modulation of the wall-thickness profile changes depending on sagging of the melt. If, for example, a periodic wall-thickness profile with the same frequency over the circumference of the tube and a specific amplitude is present directly at the exit from an extruder nozzle of the extrusion device, both the frequency and the amplitude of the wall-thickness profile can change during the sagging of the melt that takes place as the tube cools down. Due to the sagging of the melt, a compression, so to speak, of the wall-thickness profile occurs in the lower region of the tube, meaning a greater frequency of the modulation of the wall-thickness profile. In addition, the modulation amplitude of the wall-thickness profile is also reduced as the tube cools down. It is presumed that the reason for this is that the modulation of the initially almost still completely present melt stiffens initially with the original phase due to the solidification of the tube material beginning from the outside in particular in cooling sections, while the still-liquid component of the melt sags downward as a result of gravity. As a result, a corresponding amplitude reduction of the wall-thickness profile presumably occurs.

On this basis, the teaching of the invention is to detect the degree of sagging of the melt from above downward using an evaluation of the frequency and/or the amplitude of the wall-thickness profile of the tube measured over the circumference. According to the invention, this is possible in a simpler and more precise way compared to the prior art. Of course, it is not mandatory to determine or, respectively, to evaluate, for example, the frequency of the wall-thickness profile directly. It is also possible, for example, to determine a variable determined by the frequency, such as a wavelength or a phase or, respectively, a phase shift of the wall-thickness profile and use it for the evaluation. The same applies to the amplitude.

In an embodiment, the wall thickness of the tube is thus measured over the circumference of the tube. In this case, the wall thickness can be measured continuously or at discrete circumferential distances over the circumference of the tube. It is preferably measured over the entire circumference of the tube, meaning an angular range of 360°. However, it is also conceivable for the wall thickness to be measured only over a part of the entire circumference, in particular a part that is characteristic for the sagging of the melt, such as an upper or lower quarter, or an upper or lower half of the circumference where sagging of the melt affects the frequency and/or amplitude of the wall-thickness profile. From the measured wall thicknesses, a wall-thickness profile over the circumference of the tube is produced, meaning a curve depicting the wall thickness over the circumference. If the wall thickness is not measured continuously but instead at discrete distances over the circumference, interpolation can be performed between the measuring points in order to produce the curve depicting the wall-thickness profile. Using the evaluation of the frequency and/or the amplitude of the wall-thickness profile produced, sagging of the melt can be determined precisely by measuring.

As explained, a frequency and/or amplitude modulation of the wall-thickness profile can be caused in particular by setting elements for the wall thickness at the outlet of the extrusion device. In this case, a wall-thickness profile, for example, with a periodic amplitude modulation can be present at the outlet of an extrusion nozzle of the extrusion device. This wall-thickness profile then changes according to a sagging of the melt, which is measured and evaluated according to the invention. However, the invention can also be used in extrusion devices that have different means for establishing the wall thickness, in particular no such setting elements. It is then possible to evaluate a change, caused by sagging of the melt, of other characteristic wall-thickness fluctuations present at the outlet of the extrusion device. Such wall-thickness fluctuations can also be introduced deliberately according to the invention. For example, it would be conceivable to design a defined circumferential portion with an increased or decreased wall thickness by suitably setting the wall thickness at the outlet of the extrusion device. For this purpose, at least one corresponding marking element that causes the increased or decreased wall thickness can be provided at the outlet of the extrusion device. In the case of sagging of the melt, a change, which can be identified by measuring, of the wall-thickness profile in the region of the increased or decreased wall thickness occurs, for example, an increase or decrease in the width of the wall portion that has an increased or decreased wall thickness could occur. An amplitude change thus occurs in the wall-thickness profile measured and produced according to the invention. From this, the sagging of the melt can then in turn be inferred.

Speaking generally, the extrusion device can have on its outlet at least one element that causes a characteristic property of the wall thickness, which can be identified or, respectively, is identified in the wall-thickness profile produced according to the invention.

According to one embodiment, sagging of the melt can be inferred from a comparison of the produced wall-thickness profile with a reference wall-thickness profile. In particular, sagging of the melt can be inferred from a comparison of the frequency and/or the amplitude of the produced wall-thickness profile with the frequency and/or the amplitude of the reference wall-thickness profile. The reference wall-thickness profile can be determined by a measurement or theoretically, in particular mathematically. The reference wall-thickness profile can be present in particular for the same circumferential portion as the produced wall-thickness profile. If the wall-thickness profile produced according to the invention is produced over the entire circumference of the tube, the reference wall-thickness profile can also be present over the entire circumference of the tube. The comparison of the produced wall-thickness profile with a reference wall-thickness profile simplifies in particular the quantitative determination of the sagging of the melt. The change, caused by the sagging, of the wall-thickness profile can be ascertained in a particularly simple manner.

In a particularly practical manner, the reference wall-thickness profile can be a periodic reference wall-thickness profile, for example, a sine or cosine-shaped reference wall-thickness profile. Such a periodic reference wall-thickness profile can be expected directly at the exit from an extruder nozzle of the extrusion device, at least when setting elements determining the wall thickness are present and uniformly arranged. Such a periodic reference wall-thickness profile is particularly suitable as a starting value for the comparison according to the invention for determining the sagging. In particular if no such setting elements are provided, the reference wall-thickness profile can, however, also be a different reference wall-thickness profile, for example, a reference wall-thickness profile modeling a characteristic wall thickness change that may be introduced deliberately.

Accordingly, the reference wall-thickness profile can be an expected or measured reference wall-thickness profile directly at the outlet of the extrusion device, in particular directly at the outlet of an extruder nozzle of the extrusion device. As already explained, a periodic profile, for example, can be expected there, in particular with a relatively large amplitude. If the wall-thickness profile measured later deviates from the reference wall-thickness profile, for example, from a periodicity of the reference wall-thickness profile, or has a changed, for example lower, amplitude than the reference wall-thickness profile, this is a qualitative and quantitative indicator for the sagging of the melt.

According to another embodiment, a deviation profile can be produced, in particular over the circumference of the tube, from the comparison between the produced wall-thickness profile and the reference wall-thickness profile. This deviation profile thus models the deviation between the produced wall-thickness profile and the reference wall-thickness profile, in particular in the form of a curve. The deviation profile can depict, for example, a wall thickness change and/or a phase change and/or a frequency change and/or an amplitude change between the produced wall-thickness profile and the reference wall-thickness profile. The deviation profile or, respectively, a profile corresponding to the deviation profile can, in a particularly suitable manner, be used as an input variable for regulating the extrusion device and/or at least one cooling section arranged downstream of the extrusion device for achieving a desired wall-thickness profile at the measurement location and/or in the completely solidified state of the tube.

The wall thickness of the tube over the circumference of the tube can be measured downstream of a first cooling section for the tube coming from the extrusion device. In particular, the measurement can take place after a first cooling section and before a second cooling section. The tube is then partially, in particular on its outer side, cooled down and solidified, but regularly still has flowable melt components in the interior.

It is also possible to predict, from the determined sagging of the melt, further sagging of the melt that is expected before the tube completely solidifies. This can take place, for example, by means of a comparison with a previously determined wall-thickness profile for a completely solidified tube. Even in the not completely solidified state of the tube, reliable statements about the wall-thickness geometry in the completely solidified state can thus be made.

According to another embodiment, a change in at least one process parameter or control parameter of the extrusion device and/or of at least one cooling section arranged downstream of the extrusion device can be identified on the basis of the determined sagging of the melt. The determined sagging is thus an important signal generator if unexpected changes arise in the production process, for example, a failure or temperature increase of a cooling liquid for the extrusion device and/or a cooling section arranged downstream of the extrusion device. Such unexpected changes in the production process can be detected early according to the invention and counteracted accordingly.

According to another embodiment, at least one control parameter of the extrusion device and/or of at least one cooling section arranged downstream of the extrusion device can be changed on the basis of the determined sagging of the melt. In this way, a stable production process can be set or, respectively, such a stable production process with optimum process conditions can be regulated.

The at least one control parameter can be changed according to a particularly practical embodiment by means of the deviation profile produced. The deviation profile is particularly suitable as a regulation variable for automated regulation.

According to another embodiment, the at least one control parameter can be changed by means of a phase-locked loop. A phase-locked loop (PLL) is a regulating method in which the phase position or, respectively, frequency of a variable oscillator is influenced through a closed control loop so that the phase deviation between an external periodic reference signal and the oscillator or a signal derived therefrom is as constant as possible. The reference frequency of the phase-locked loop can correspond, for example, to the number of setting elements of an extruder nozzle of the extrusion device. Using a phase detector, a phase deviation between the produced wall-thickness profile and the reference wall-thickness profile with the reference frequency is used in order to regulate the frequency of a voltage-controlled oscillator, the control voltage of which depicts a model of the frequency change, meaning in particular corresponds to the deviation profile. The phase detector can provide, for example, the deviation profile between the measured wall-thickness profile and the reference wall-thickness profile as an output signal. With such a phase-locked loop, in the present case the at least one control parameter can be changed in a particularly suitable way. Of course, other methods would also be conceivable, for example, using a bandpass filter with a narrow bandwidth so that only the modulation frequency can pass. Using a frequency discriminator would also be conceivable. A bandpass filter can be used, for example, in combination with a downstream phase detector, wherein the phase detector compares the phases of a measured wall-thickness profile filtered through a bandpass filter and a reference wall-thickness profile and outputs the phase difference. The phase difference can then be used as a basis for a change in the at least one control parameter. Using a bandpass filter with a downstream frequency discriminator would also be conceivable, wherein the frequency discriminator compares the frequencies of a measured wall-thickness profile filtered through a bandpass filter and a reference wall-thickness profile and outputs the frequency difference. This can then be used in turn as a basis for a change in the at least one control parameter.

The at least one control parameter can be, for example, an output capacity of the extrusion device and/or a melt temperature in the extrusion device and/or a temperature and/or position of setting elements of the extrusion device determining the geometry of the tube at the outlet of the extrusion device.

According to another embodiment, it can be provided that, to measure the wall thickness of the tube, terahertz radiation is emitted toward the tube, terahertz radiation reflected from the tube is detected, and the wall thickness of the tube is determined from the detected terahertz radiation, in particular the intensity of the detected terahertz radiation. In this embodiment, terahertz radiation is emitted toward the tube. The terahertz radiation can partially enter into the tube. It is reflected at (external and, optionally, internal) boundary surfaces of the tube and is detected by a suitable detector. The frequency of the terahertz radiation can, for example, lie in a frequency range of 10 GHz to 3 THz. It can be so-called millimeter waves. A transmitter emitting the terahertz radiation and a detector receiving the reflected terahertz radiation can substantially be arranged at the same location. They can be integrated into a transceiver, for example. Geometric parameters can be determined in a reliable manner with terahertz radiation, including in particular in difficult process environments in which optical systems such as lasers experience difficulties. In addition, this measurement method offers sufficient accuracy to confidently detect the frequency and/or amplitude modulation of the wall-thickness profile evaluated according to the invention. Determining the wall thickness with terahertz radiation is described, for example, in WO 2016/139155 A1. Accordingly, reference is made to this document.

The terahertz radiation can be modulated continuous wave terahertz radiation, in particular frequency-modulated continuous wave terahertz radiation. The terahertz radiation can also be pulse-modulated terahertz radiation or phase-modulated terahertz radiation. The frequency modulation can comprise a frequency burst or multiple frequency bursts. In particular, a so-called frequency sweep can occur, in which a predefined frequency range is traversed once or multiple times. A so-called time domain reflectometry method or frequency domain reflectometry method can, for example, be deployed as pulse-modulated or phase-modulated terahertz radiation. It is also conceivable that multiple discrete frequencies are sent, instead of one frequency spectrum.

The wall thickness of the tube can be determined from a propagation time measurement of the terahertz radiation emitted and reflected by the tube as described, by way of example, in WO 2016/139155 A1.

According to a further embodiment, it can be provided that at least one transmitter for emitting the terahertz radiation and at least one detector for detecting the terahertz radiation emitted and reflected by the tube is rotated about the longitudinal axis of the tube, preferably along a circular path, during the emission and detection of the terahertz radiation. By rotating or, respectively, shifting a pair comprised of transmitter and detector, for example, a transceiver, values for the wall thickness can be detected distributed over the circumference of the tube. Of course, it would also be conceivable to arrange multiple pairs of transmitters and receivers distributed over the circumference of the tube and, in this way, to determine multiple measuring values over the circumference.

BRIEF DESCRIPTION OF THE DRAWINGS

An exemplary embodiment of the invention is explained below in greater detail with reference to figures.

The same reference numbers refer to the same objects in the figures unless indicated otherwise.

DETAILED DESCRIPTION OF THE INVENTION

Figure 1:
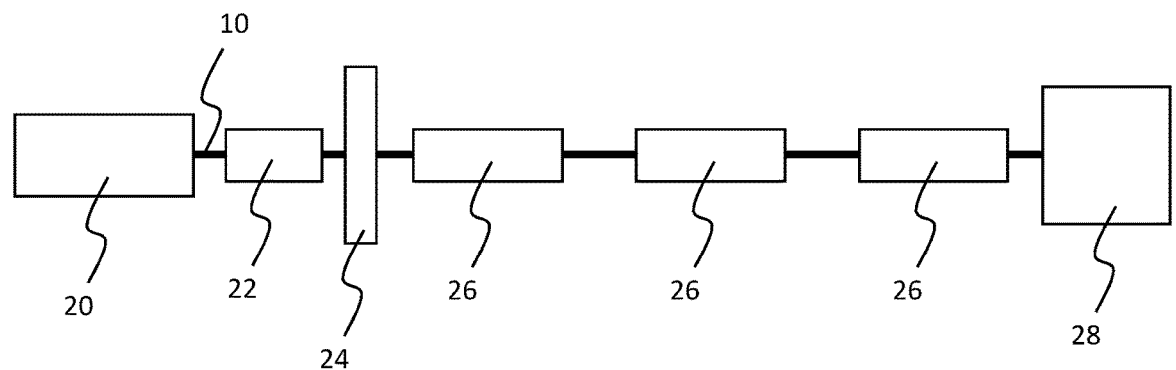
FIG. 1 is a schematic side view of an embodiment of a device for carrying out the method according to the invention.
Figure 2:
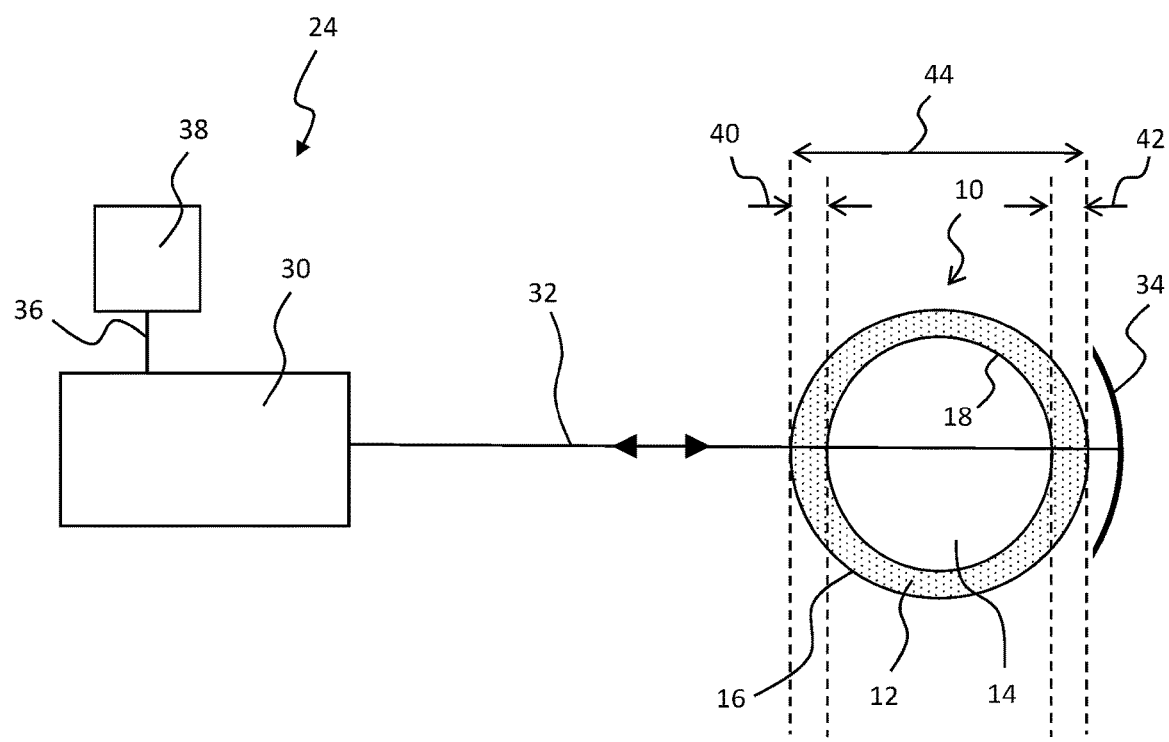
FIG. 2 is a partial sectional view of the embodiment of FIG. 1.

A tube 10, in the present case a plastic tube 10, is depicted in FIGS. 1 and 2, which has a wall 12, a hollow space 14 delimited by the tube 10, an outer surface 16 which is circular in cross-section and an inner surface 18 which is likewise circular in cross-section, which delimits the hollow space 14. The plastic tube 10 is, in the present example, extruded with the aid of an extruder in an extrusion device 20 and conveyed along its longitudinal axis by means of a suitable conveying apparatus, from left to right in FIG. 1. After exiting from an extruder nozzle of the extrusion device 20, the tube 10 initially passes through a first cooling section 22, in which the tube 10, which exits the extrusion device 20 heated to a great extent and not yet completely solidified, that is to say still having flowable components (melt), is cooled down. Further along in the procedure, the tube 10 passes through a measuring device 24, in which the wall thickness of the tube 10 is determined over the circumference of the tube 10 in a manner explained in more detail below. Following the measuring device 24, the tube 10 passes through further cooling sections 26, in which further cooling occurs. After the tube 10 has completely solidified, it is cut to predefined lengths, for example in a cutting-to-length apparatus 28.

The structure and the function of the measuring device 24 are to be explained in greater detail with reference to FIG. 2. In the depicted example, the measuring device 24 comprises a transceiver 30, in which a transmitter and a detector for terahertz radiation are combined. The transmitter emits terahertz radiation 32 toward the tube 10. The terahertz radiation is reflected at different boundary surfaces of the tube 10 and at a reflector 34 arranged opposite the transceiver 30 and travels back to the transceiver 30 where it is detected by the detector. The transceiver 30 is, furthermore, connected to an evaluating apparatus 38 via a line 36. The reflected radiation received by the detector generates corresponding measuring signals which are forwarded to the evaluating apparatus 38 via the line 36. In this way, the evaluating apparatus 38 can determine the wall thicknesses 40, 42 drawn in in FIG. 2 for example, using propagation time measurements.

In this case, the measuring device 24 is rotated about the longitudinal axis of the tube during the measurement, for example, of the wall thickness 40, wherein the wall thickness is measured continuously or at discrete distances over the complete circumference of the tube 10 and a wall-thickness profile over the circumference of the tube is produced from this.

Figure 3:
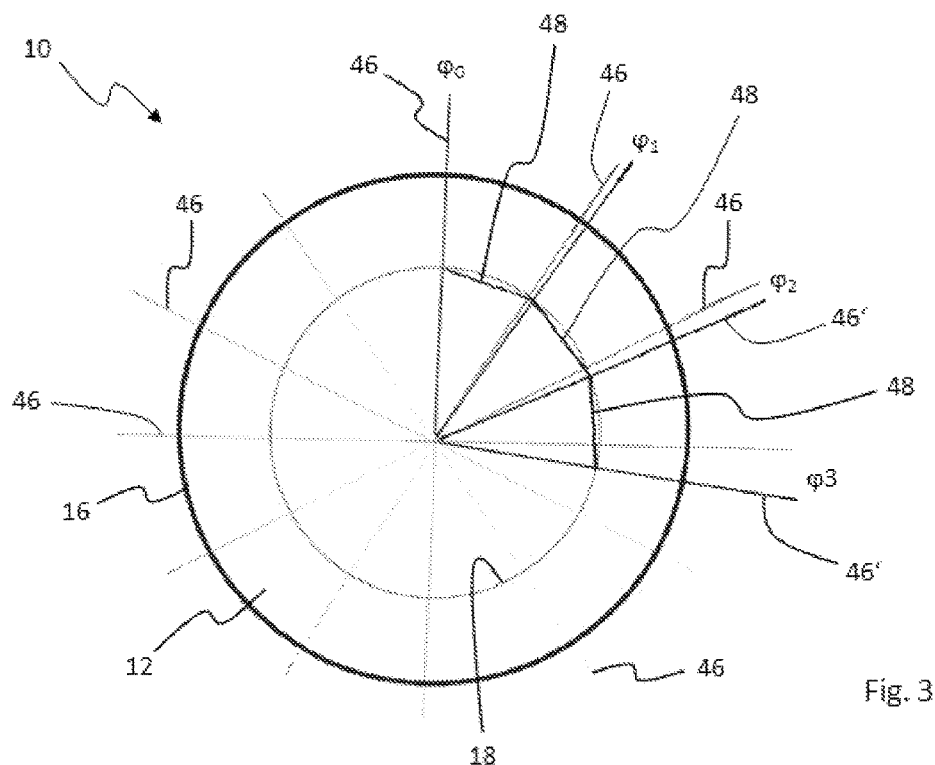
FIG. 3 is a cross-sectional view of an embodiment of a tube from FIGS. 1 and 2 illustrating sagging of melt.

The tube 10 is depicted in a cross-section in FIG. 3, wherein boundary surfaces between adjacent plate-shaped setting elements of the extruder nozzle of the extrusion device 20 are illustrated by the rays 46 drawn in at regular angular distances. The setting elements are modeled in the wall geometry in the extruded tube before it cools down, in particular in the region of the inner tube walls. Without sagging of the melt occurring, these setting elements would be reflected on the inner wall 18 of the tube 10 corresponding to their original distances according to the rays 46. Actually, due to the sagging of the melt while it cools down, a shift of the regions modeled by the setting elements occurs, starting from the angular position designated with $\varphi 0$, accordingly the upper side of the tube 10 in particular initially stretches, as marked in FIG. 3 by the rays 46' at the angular positions $\varphi 1$, $\varphi 2$ and $\varphi 3$ and the regions 48, and subsequently a compressing to the underside of the tube 10 occurs.

Figure 4:
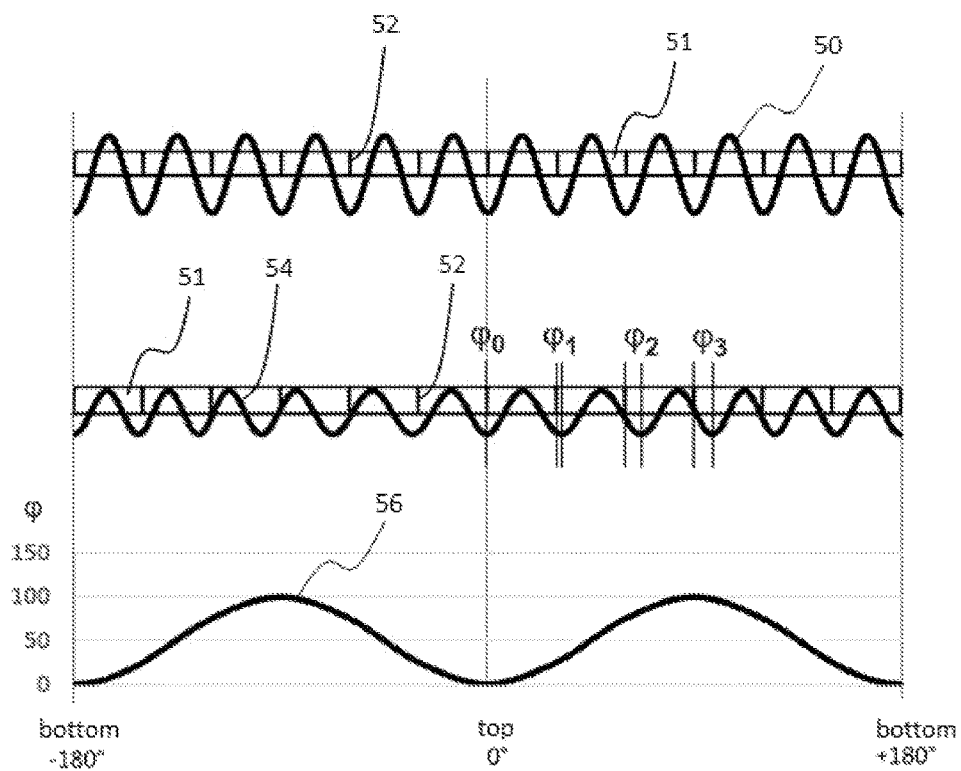
FIG. 4 shows three diagrams to illustrate the method according to the invention.

This effect is depicted in FIG. 4 for a wall-thickness profile over the circumference of the tube, in particular from 0° to +180° and 0° to −180°, wherein 0° is the upper side of the tube. In FIG. 4, in the two top diagrams, the wall thickness is plotted in each case over the circumferential angle. In the uppermost diagram in FIG. 4, a reference wall-thickness profile 50 is shown, in the depicted example a cosine-shaped profile with constant frequency and amplitude. The reference wall-thickness profile is the profile expected directly at the exit from the extruder nozzle of the extrusion device 20. For illustration, the setting elements 51 of the extruder nozzle and the boundary surfaces 52 formed between them are drawn in in FIG. 4. The frequency of the reference wall-thickness profile 50 corresponds to the frequency of the setting elements 51 or, respectively, boundary surfaces 52 of the extruder nozzle distributed uniformly over the circumference.

The middle diagram in FIG. 4 schematically shows a wall-thickness profile 54 measured over the circumference of the tube 10 at the measuring position of the measuring device 24 shown in FIG. 1. On the one hand, it can be seen that the amplitude of the measured wall-thickness profile 54 is smaller than the amplitude of the reference wall-thickness profile 50. It can also be seen that, as the circumferential angle increases, starting from the uppermost position of the tube at 0° downward, corresponding to the shift of the rays 46' shown in FIG. 3, a deviation of the frequency from the reference wall-thickness profile 50 occurs, in particular initially a decrease in the frequency until the angular position $\varphi_3$ and then an increase in the frequency until the underside of the tube at 180°.

In the lowermost diagram in FIG. 4, a deviation profile 56 produced from a comparison between the measured wall-thickness profile 54 and the reference wall-thickness profile 50 is depicted. The deviation profile shows a phase shift $\varphi$ of the measured wall-thickness profile 54 compared to the reference wall-thickness profile 50. The deviation profile 56 can form the output of a phase detector, on the basis of which at least one control parameter of the extrusion device and or the first cooling section 22 or also the additional cooling sections 26 is changed in order to generate a desired wall-thickness profile, for example, a periodic wall-thickness profile, at the measurement location of the measuring device 24 or, respectively, in the completely cooled-down state of the tube 10.

It is also possible, for example, to predict, for example by comparing with a wall-thickness profile produced in the completely solidified state of a corresponding tube 10, further sagging of the melt to be expected before the tube 10 completely solidifies using the wall-thickness profile 54 produced at the measurement location of the measuring device 24, at which the tube 10 regularly still has flowable components.

LIST OF REFERENCE SIGNS

10 Tube
12 Wall
14 Hollow space
16 Outer surface
18 Inner wall
20 Extrusion device
22, 26 Cooling section
24 Measuring device
28 Cutting-to-length apparatus
30 Transceiver
32 Terahertz radiation
34 Reflector
36 Line
38 Evaluation apparatus
40,42 Wall thickness
46,46' Rays
48 Regions
50 Reference wall-thickness profile
51 Setting elements
52 Boundary surfaces
54 Wall-thickness profile
56 Deviation profile

The invention claimed is:

1. A method for determining sagging of melt of a tube extruded in an extrusion process, comprising:
    measuring a wall thickness of the tube over a circumference of the tube;
    determining a wall-thickness profile over the circumference of the tube from the measured wall thicknesses, wherein the wall-thickness profile includes a frequency;
    comparing the wall-thickness profile with a reference wall-thickness profile;
    determining the sagging of the melt from a change in the frequency between the reference wall-thickness profile and the determined wall-thickness profile; and
    applying a change to at least one control parameter of the extrusion process based on the determined sagging of the melt to control the sagging of the melt.

2. The method according to claim 1, wherein the reference wall-thickness profile comprises a periodic reference wall-thickness profile.

3. The method according to claim 1, wherein the reference wall-thickness profile comprises a measured reference wall-thickness profile directly at an outlet of an extrusion device used in the extrusion process.

4. The method according to claim 1, further comprising generating a deviation profile from the comparison between the wall-thickness profile and the reference wall-thickness profile.

5. The method according to claim 4, further comprising:
    measuring the wall thickness of the tube over the circumference of the tube at a position downstream of a first cooling section; and
    cooling the tube emerging from an extrusion device via the first cooling section.

6. The method according to claim 5, further comprising identifying the at least one control parameter of at least one of (i) the extrusion device and (ii) the first cooling section based on the determined sagging of the melt.

7. The method according to claim 6, further comprising changing the at least one control parameter based on the deviation profile.

8. The method according to claim 6, further comprising changing the at least one control parameter by means of a phase-locked loop.

9. The method according to claim 6, wherein the at least one control parameter is at least one of: (i) an output capacity of the extrusion device; (ii) a melt temperature in the extrusion device; (iii) a temperature; and (iv) a position of setting elements of the extrusion device determining a geometry of the tube at an outlet of the extrusion device.

10. The method according to claim 1, further comprising predicting further sagging of the melt before the tube completely solidifies from the determined sagging of the melt.

11. The method according to claim 1, wherein the measuring the wall thickness of the tube over the circumference of the tube comprises:
    emitting terahertz radiation towards the tube and over the circumference of the tube;
    detecting the terahertz radiation reflected by the tube;

generating measuring signals corresponding to the detected terahertz radiation; and determining the wall thickness over the circumference of the tube based on a propagation time of the measuring signals.

12. The method according to claim 11, wherein the terahertz radiation comprises modulated continuous wave terahertz radiation.

13. The method according to claim 11, wherein:

at least one transmitter is configured to emit the terahertz radiation; and at least one detector is configured to detect the terahertz radiation emitted and reflected by the tube, wherein the at least one transmitter is configured to be rotated about a longitudinal axis of the tube during the emission and detection of the terahertz radiation.

\* \* \* \* \*